US009226021B2

(12) United States Patent
Meng et al.

(10) Patent No.: US 9,226,021 B2
(45) Date of Patent: Dec. 29, 2015

(54) METHOD AND SYSTEM FOR REALIZING MUTUAL CONTROL OF MULTIMEDIA TERMINALS IN THE HOME

(71) Applicant: Goertak, Inc., Weifang, ShanDong Province (CN)

(72) Inventors: Ce Meng, Weifang (CN); Binbin Jiang, Weifang (CN); Chongle Wang, Weifang (CN)

(73) Assignee: Goertek, Inc., Weifang, Shandong Province (CN)

( * ) Notice: Subject to any disclaimer, the term of this patent is extended or adjusted under 35 U.S.C. 154(b) by 0 days.

(21) Appl. No.: 14/389,260

(22) PCT Filed: Aug. 6, 2013

(86) PCT No.: PCT/CN2013/080926
§ 371 (c)(1),
(2) Date: Sep. 29, 2014

(87) PCT Pub. No.: WO2014/023223
PCT Pub. Date: Feb. 13, 2014

(65) Prior Publication Data
US 2015/0067743 A1    Mar. 5, 2015

(30) Foreign Application Priority Data

Aug. 7, 2012    (CN) .......................... 2012 1 0278729

(51) Int. Cl.
*H04N 7/18* (2006.01)
*H04N 21/436* (2011.01)
(Continued)

(52) U.S. Cl.
CPC ... *H04N 21/43615* (2013.01); *H04N 21/25875* (2013.01); *H04N 21/25891* (2013.01);
(Continued)

(58) Field of Classification Search
CPC ................................................ H04N 21/42204
See application file for complete search history.

(56) References Cited

U.S. PATENT DOCUMENTS 7,908,631 B1*    3/2011    Zhang et al. .................. 725/105
2005/0232210 A1*  10/2005   Karaoguz et al. ............. 370/338
(Continued)

FOREIGN PATENT DOCUMENTS

| CN | 101938616 A | 1/2011 |
| CN | 102130900 A | 7/2011 |

(Continued)

*Primary Examiner* — Junior Mendoza
(74) *Attorney, Agent, or Firm* — Boyle Frederickson, S.C.

(57) ABSTRACT

The invention discloses a method and system for realizing mutual control of multimedia terminals in the home. The method comprises the following steps: when a registered user logs on the multimedia terminals, an interactive server establishes network connection with the multimedia terminals, and obtains the identification and the type of the multimedia terminals; the interactive server receives a control message which is sent by a control terminal and is used for controlling a player terminal, the control message containing a control command description and an identification of the player terminal; the interactive server parses the control message according to the type of the control terminal, converts the control command description into a control command corresponding to the player terminal according to the identification of the player terminal, and sends the control command to the player terminal so that the player terminal executes the received control command. By the present invention, the problem of mutual control between multiple multimedia terminals in the home environment can be solved.

6 Claims, 4 Drawing Sheets

(51) Int. Cl.

| | | |
|---|---|---|
| *H04N 21/41* | (2011.01) | |
| *H04N 21/442* | (2011.01) | |
| *H04N 21/6371* | (2011.01) | |
| *H04N 21/6587* | (2011.01) | |
| *H04N 21/258* | (2011.01) | |
| *H04N 21/422* | (2011.01) | |
| *H04N 21/4227* | (2011.01) | |
| *H04N 21/475* | (2011.01) | |
| *H04N 21/658* | (2011.01) | |
| *H04N 21/845* | (2011.01) | |
| *H04N 5/44* | (2011.01) | |

(52) U.S. Cl.
CPC ....... *H04N21/4108* (2013.01); *H04N 21/4227* (2013.01); *H04N 21/42204* (2013.01); *H04N 21/44218* (2013.01); *H04N 21/4753* (2013.01); *H04N 21/6371* (2013.01); *H04N 21/6582* (2013.01); *H04N 21/6587* (2013.01); *H04N 21/8455* (2013.01); *H04N 2005/4405* (2013.01); *H04N 2005/4433* (2013.01)

(56) References Cited

U.S. PATENT DOCUMENTS

| | | | |
|---|---|---|---|
| 2008/0028430 A1* | 1/2008 | Kreiner et al. | 725/78 |
| 2008/0077964 A1* | 3/2008 | Hamilton | 725/87 |
| 2009/0298535 A1* | 12/2009 | Klein et al. | 455/556.1 |
| 2012/0124624 A1* | 5/2012 | Lau et al. | 725/39 |
| 2012/0173767 A1 | 7/2012 | Kim et al. | |

FOREIGN PATENT DOCUMENTS

| | | |
|---|---|---|
| CN | 102377823 A | 3/2012 |
| CN | 102821015 A | 12/2012 |

* cited by examiner

METHOD AND SYSTEM FOR REALIZING MUTUAL CONTROL OF MULTIMEDIA TERMINALS IN THE HOME

TECHNICAL FIELD

The invention relates to the field of home multimedia, and particularly to a method and system for realizing mutual control of multimedia terminals in the home.

BACKGROUND ART

With the development of consumer electronics technology, it has been gradually accepted by common consumers to watch TV programs through a variety of multimedia terminals in the home. Multimedia terminals are terminals capable of playing multimedia audio and video, such as televisions, personal computers and mobile phones. In particular, due to the rapid development of smart operating system, nowadays mobile phones and TVs all have the same smart operating system as the personal computer.

Due to different uses of multimedia terminals, their control means will vary when being used. For example, TVs are controlled by an infrared remote control, cell phones are controlled directly by forger touch, and personal computers are controlled by a keyboard and a mouse. The operation of all of these multimedia terminals has both advantages and disadvantages. For example, when an infrared remote control of TV is used to seek and play a video resource on a TV, the corresponding signal source mode needs to be switched. Thus, the operating steps are cumbersome, the remote control distance and angle are restricted, and it lacks of remote control. How to enable these different types of multimedia terminals to be controlled mutually in the home environment has become a problem to be solved urgently.

SUMMARY OF THE INVENTION

The invention provides a method and system for realizing mutual control of multimedia terminals in the home to solve the problem of mutually control between different types of multimedia terminals in the home environment, The invention discloses a method for realizing mutual control of multimedia terminals in the home, the method comprising:

when a registered user logs on the multimedia terminals, an interactive server establishes network connection with the multimedia terminals, and obtains the identification and the type of the multimedia terminals;

the interactive server receives a control message which is sent by a control terminal and is used for controlling a player terminal, the control message containing a control command description and an identification of the player terminal; wherein the control terminal is a multimedia terminal controlling another multimedia terminal, and the player terminal is a multimedia terminal playing multimedia data;

the interactive server parses the control message according to the type of the control terminal, converts the control command description into a control command corresponding to the player terminal according to the identification of the player terminal, and sends the control command to the player terminal so that the player terminal executes the control command.

The invention further discloses a system for realizing mutual control of multimedia terminals in the home, the system comprising: an interactive server and a plurality of multimedia terminals;

the multimedia terminals being for establishing a network connection with the interactive server when a registered user logs on, sending to the interactive server a control message for controlling a player terminal when used as a control terminal for controlling another multimedia terminal, and executing the received control command when used as a player terminal playing multimedia data, the control message containing a control command description and an identification of the player terminal.

the interactive server comprising:

an information acquisition module being for acquiring the identification and type of the multimedia terminals and saving them into the database of the interactive server when establishing a network connection with the multimedia terminals; and a control processing module being for parsing the received control message according to the type of the control terminal, converting the control command description into a control command corresponding to the player terminal according to the identification of the player terminal in the control message, and sending the control command to the player terminal.

The beneficial effects of the invention are: in the present invention, an interactive server parses the control message sent by a control terminal, converts the control command description in the control message into a control command corresponding to the player terminal, and sends the control command to the player terminal, wherein the control message sent by the control terminal to the player terminal is parsed by the interactive server and is converted into a control command usable by the player terminal, thereby realizing mutual control between different types of multimedia terminals.

DETAILED DESCRIPTION OF INVENTION

To make the object, technical scheme and advantages of the invention clearer, the embodiments of the invention are described in further detail with reference to the drawings.

Figure 1:
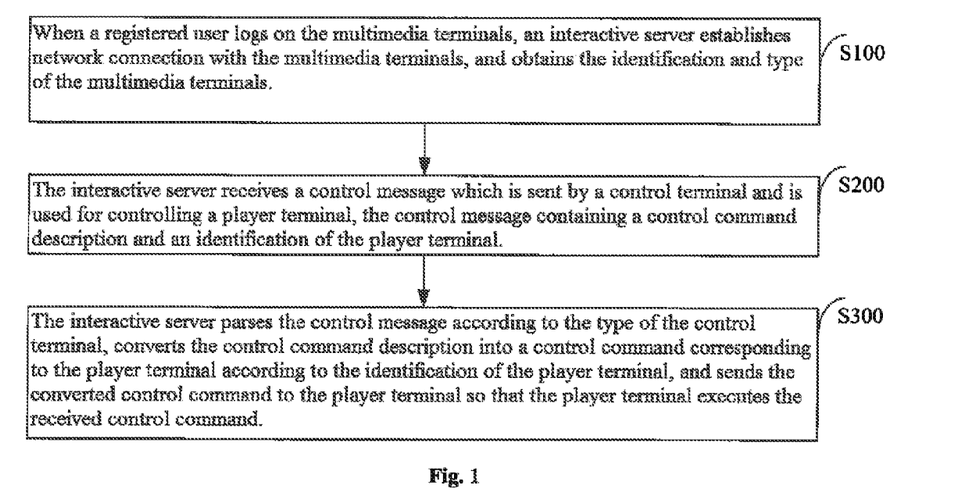
FIG. 1 is a flowchart showing a method for realizing mutual control of multimedia terminals in the home in the present invention.

FIG. 1 is a method for realizing mutual control of multimedia terminals in the home provided by the present invention. The method comprises the following steps:

Step S100, when a registered user logs on the multimedia terminals, an interactive server establishes network connection with the multimedia terminals, and obtains the identification and type of the multimedia terminals.

Step S200, the interactive server receives a control message which is sent by a control terminal and is used for controlling a player terminal, the control message containing a control command description and an identification of the player terminal; wherein the control terminal is a multimedia terminal controlling another multimedia terminal, and the player terminal is a multimedia terminal playing multimedia data.

Step S300, the interactive server parses the control message according to the type of the control terminal, converts the control command description into a control command corresponding to the player terminal according to the identification of the player terminal, and sends the converted control command to the player terminal so that the player terminal executes the received control command.

Therein, the multimedia data comprise: video, audio, pictures, documents and so on.

By the above method, mutual control between different multimedia terminals can be realized, and one-key control or mode control to player terminal can be easily realized. For example, since it is more convenient to input a control command into a cell phone or computer than into a traditional TV remote control, it can be realized by this method to control TV by a cell phone or computer to make it easier to control the mode of TV.

In one embodiment, the interactive server converting the control command description into a control command corresponding to the player terminal according to the identification of the player terminal in the control message comprises:

The interactive server seeks a control command list corresponding to the player terminal according to the identification of the player terminal.

The interactive server seeks a control command corresponding to the control command description from the control command list.

Since the hardware and system vary between different multimedia terminals, the control commands are different between different types of multimedia terminals. However, these control commands have the same operation types, e.g., they all include the operation types such as play, volume adjustment, brightness adjustment and so on. The control command description in the control message of the control terminal records the operation type of the control command.

At initialization, various control commands of multimedia terminals are stored in the interactive server, which are called real control commands. In this embodiment, the real control commands of the multimedia terminals are stored in the form of a list. The interactive server parses a control command description from the control message of the control terminal, determines a control command list of the player terminal according to the identification of the player terminal, seeks a control command corresponding to the control command description from the determined control command list, and sends this control command to the player terminal.

The manner of realizing the conversion from a control command description into a control command corresponding to a player terminal in the invention is not limited thereto. For example, the control command description may be an identification of the operation type, the type of the player terminal is determined by the identification of the player terminal, the identification of the operation type is converted into the content of the control command of the player terminal according to the type of the player terminal, and the content of the control command is packaged corresponding to the type of the player terminal.

By means of this embodiment, the flexibility of control is improved, the difference between various multimedia terminals is shielded, and compatibility of various multimedia terminals is realized.

Furthermore, if the multimedia terminals change, only by updating the real control commands of the multimedia terminals on the interactive server, the mutual control between multimedia terminals can still be realized by the above method.

For example, in the case where a multimedia terminal, PAD, is changed to another multimedia terminal, ANDROID Tablet (their operating systems are different and the corresponding control commands are also different), it is only needed to update the real control command of the multimedia terminal in the database but it does not need to modify the control message sent by the control terminal.

Moreover, the interactive server may also reply the terminal information of the player terminal, e.g., IP address of the player terminal, to the control terminal after receiving the control message of the control terminal. The control terminal connects and interacts directly with the player terminal according to the terminal information.

In one embodiment, the interactive server sending the control command to the player terminal specifically comprises: the interactive server stores the control command when the player terminal is offline and sends the control command to the player terminal when the player terminal is online.

The offline means that the registered user does not log on the multimedia terminals and no connection is established between the multimedia terminals and the interactive server; the online means that the registered user logs on the multimedia terminals and the connection is established between the multimedia terminals and the interactive server.

By means of this embodiment, control message can be sent offline, and can be forwarded automatically in a timely manner when the player terminal is online.

In one embodiment, the method further comprises: the interactive server informs the multimedia terminals to copy the updated multimedia data into the interactive server when the multimedia data of the multimedia terminals are updated.

Further, the method further comprises: the interactive server delivers the updated multimedia data to the multimedia terminals that have no updated multimedia data.

The multimedia terminals that have no updated multimedia data are called multimedia terminals to be delivered.

If the format of the multimedia data used in the multimedia terminals providing multimedia data is different from the format of the multimedia data used in the multimedia terminals to be delivered, the interactive server will perform the delivery after converting the format of the updated multimedia data into the format of the multimedia data used in the multimedia terminals to be delivered.

In the prior art, the multimedia resources in different multimedia terminals are acquired in different ways, the multimedia resources vary with the multimedia terminals, and the different multimedia terminals can only access their own multimedia resources. However, consumers are increasingly hoping that the contents can freely circulate among different multimedia terminals such as TVs, computers and cell phones. For example, no matter at home, or on the way to work, or in leisure relaxing time, they can uninterruptedly watch the same multimedia content. Therefore, multimedia resources in the home need to be managed uniformly so as to achieve the effect of seamlessly watching the same content. By means of the present embodiment, the multimedia data of various multimedia terminals can be shared, thereby achieving the effect of seamlessly watching the same content.

In one embodiment, the method further comprises:
the interactive server updates the stored record of operating behavior of a registered user according to the record of operating behavior of the registered user on the multimedia terminals that are sent by the multimedia terminals;

the interactive server provides the player terminal with the stored record of operating behavior of the registered user and indicates whether the player terminal takes the stop time of the last play as the start time of the current play, when the player terminal is playing the multimedia data according to the control command sent.

The record of operating behavior is behavior by a registered user in a local multimedia terminal, such as a record of watching a video and a playlist of music. In this embodiment, the multimedia terminals can acquire from the database of the interactive server the watching record of the current registered user last time, e.g., record of the time when the program is withdrawn. Thus, when the registered user watches again, the program can be played starting from the time when the last watching stops.

Embodiment

Figure 2:
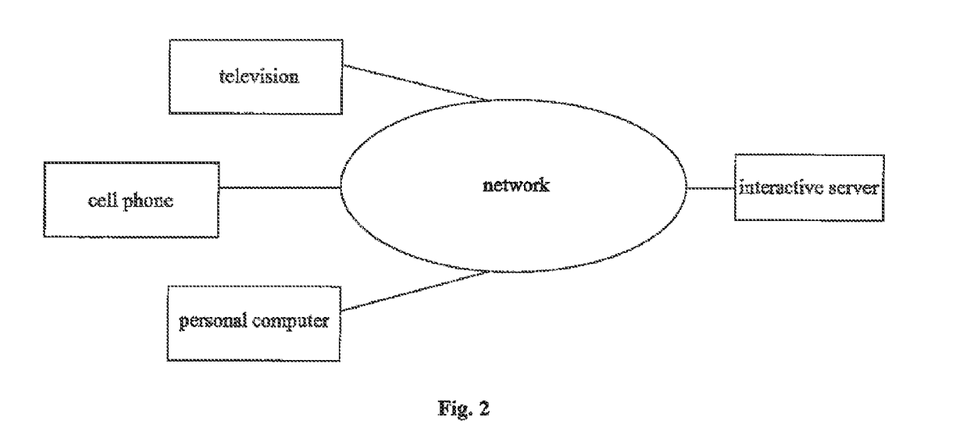
FIG. 2 is a structural diagram showing the arrangement of devices in the home environment in an embodiment of the present invention.

FIG. 2 is a structural diagram showing the arrangement of devices in the home environment in an embodiment of the present invention. The devices arranged in the home environment comprise: multimedia terminals, network and an interactive server, wherein the multimedia terminals comprise: a television, a cell phone, and a personal computer, which are called a three-screen terminal. The network is a transmission channel for the interaction between the devices, including wireless network (2G/3G/4G/Wifi/BLUETOOTH, etc.) and fixed network (cable, fiber). In actual application process, the same business may adopt a variety of networks. For example, a device may firstly be connected to the interactive server via a 2G/3G wireless network; if that fails, it may be connected to a network device via a network cable; if that still fails, other communication means such as BLUETOOTH may be used for the connection; and therefore, communication connection with another device is established for interaction.

Figure 4:
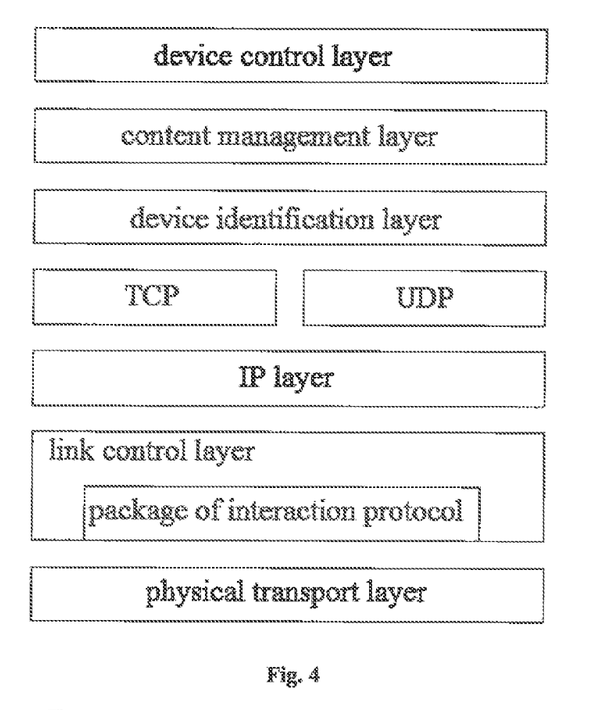
FIG. 4 is a protocol architecture diagram showing the interaction between multimedia terminals and an interactive server in an embodiment of the present invention.

FIG. 4 is a protocol architecture diagram showing the interaction between multimedia terminals and an interactive server in an embodiment of the present invention.

The interaction protocol includes a network transport layer, a device identification layer, a content management layer and a device control layer.

The network transport layer, as the bottom layer, comprises a physical transport layer, a link control layer, an IP layer, and a TCP and UDP layer, wherein the physical transport layer may be a wired connection or a wireless connection, and the link control layer completes the package of the interaction protocol.

The device identification layer is mainly for interacting the basic information, such as the type of the multimedia terminals and the online status, of the multimedia terminals.

The content management layer is mainly for interacting information related to the content management, so as to realize content service management, such as the content synchronization and the content delivery.

The device control layer is mainly for interacting the information that achieves mutual control between multimedia terminals, such as the brightness adjustment of a device screen and the volume adjustment of a device as well as the play controls including play, pause, fast forward, rewind, etc of multimedia data.

Figure 3:
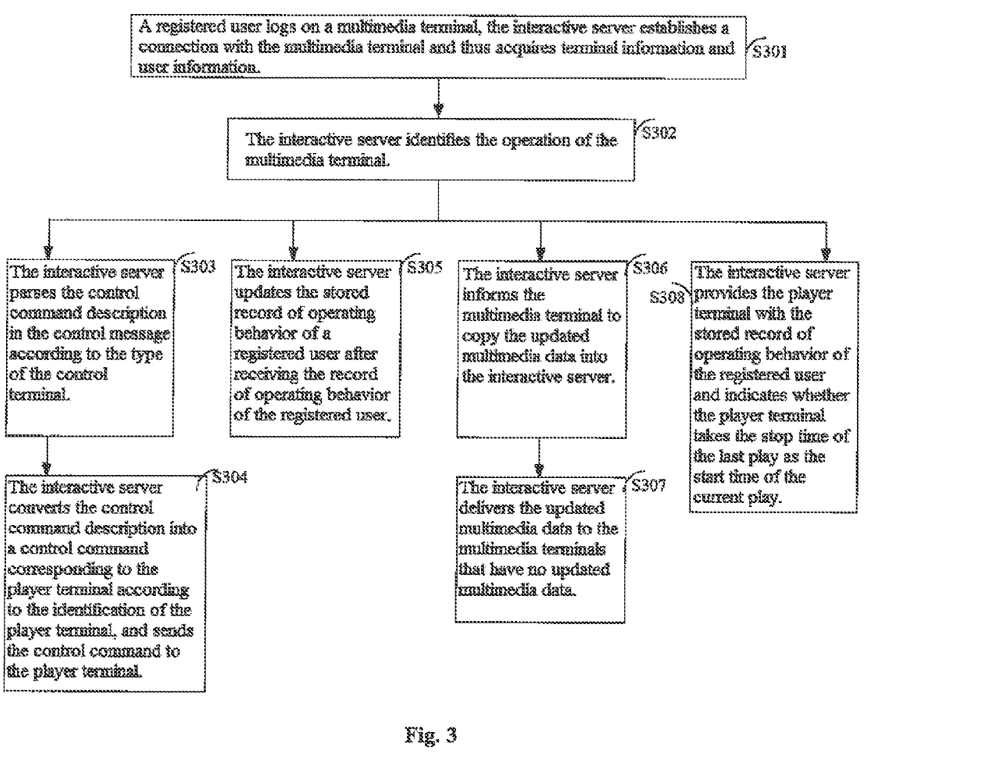
FIG. 3 is a flowchart showing the operation of an interactive server in an embodiment of the present invention.

FIG. 3 is a flowchart showing the operation of an interactive server in an embodiment of the present invention. Firstly a registered user logs on, by which a connection between multimedia terminals and the interactive server is established. For example, if a registered user watches TV in a living room and the smart TV is connected with the interactive server via a network cable, a connection between the TV and the interactive server will be established after the registered user logs on from the TV. The interactive server will perform corresponding process according to the operation of the registered user.

Step S301, a registered user logs on a multimedia terminal, the interactive server establishes a connection with the multimedia terminal and thus acquires terminal information and user information.

The terminal information comprises: type, identification and IP address of the multimedia terminal.

The user information comprises: the user's personal information and the record of operating behavior of the user. The user's personal information comprises: the logon account of the user and the preference information of the user. The record of operating behavior of the user is behavior by the user in a local multimedia terminal, such as a record of watching a video and a playlist of music.

Step S302, the interactive server identifies the operation of the multimedia terminal, and it executes step S303 if the multimedia terminal sends a control message, executes step S305 if the multimedia terminal reports a newly recorded operating behavior of the registered user, executes step S306 if multimedia data of the multimedia terminal are updated, and executes step S308 if the multimedia terminal plays the multimedia data according to the received control command.

Step S303, the interactive server parses the control command description in the control message according to the type of the control terminal.

The interactive server acquires the terminal information of the control terminal according to the logon account of the control terminal and parses the control message according to the type of the multimedia terminal, the terminal information comprising the type and identification of the multimedia terminal.

Step S304, the interactive server converts the control command description into a control command corresponding to the player terminal according to the identification of the player terminal, and sends the control command to the player terminal.

The interactive server stores the control command when the player terminal is offline and sends the control command to the player terminal when the player terminal is online.

Step S305, the interactive server updates the stored record of operating behavior of a registered user after receiving the record of operating behavior of the registered user The operating behavior of the registered user occurs in a variety of situations. For example, when the registered user watches videos via a smart TV, operating behavior may be generated during the watching process, e.g., generating a playlist of videos and play time of videos when playing different programs. The operating behavior of the registered user will be recorded by the multimedia terminal and then sent to the interactive server via network.

Step S306, the interactive server informs the multimedia terminal to copy the updated multimedia data into the interactive server.

Step S307, the interactive server delivers the updated multimedia data to the multimedia terminals that have no updated multimedia data.

Step S308, the interactive server provides the player terminal with the stored record of operating behavior of the registered user and indicates whether the player terminal takes the stop time of the last play as the start time of the current play. The multimedia terminal may play with the received stop time of the last play of the multimedia data as the start time, such that the registered user can continue to play from where the last play stops.

Figure 5:
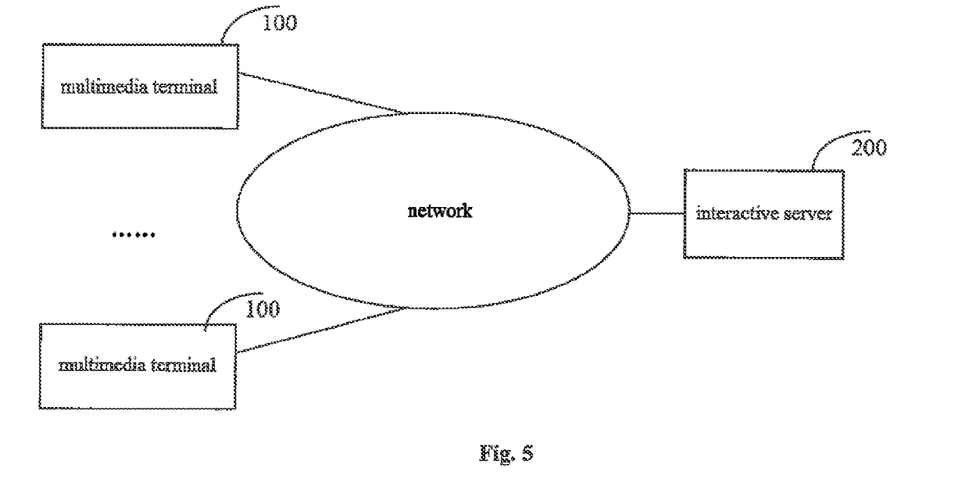
FIG. 5 is a structural diagram showing a system for realizing mutual control of multimedia terminals in the home in the present invention.

The invention discloses a system for realizing mutual control of multimedia terminals 100 in the home, as shown in FIG. 5. The system comprises: a plurality of multimedia terminals 100 and an interactive server 200.

The multimedia terminals 100 is for establishing a network connection with the interactive server 200 when a registered user logs on, sending to the interactive server 200 a control message for controlling a player terminal when used as a control terminal for controlling another multimedia terminal 100, and executing the received control command when used as a player terminal playing multimedia data, the control message containing a control command description and an identification of the player terminal.

The interactive server 200 comprises: an information acquisition module, a control processing module, and a database.

The information acquisition module is for acquiring the identification and type of the multimedia terminals 100 and saving them into the database of the interactive server when establishing a network connection with the multimedia terminals 100; and The control processing module is for parsing the received control message according to the type of the control terminal, converting the control command description into a control command corresponding to the player terminal according to the identification of the player terminal in the control message, and sending the control command to the player terminal.

The multimedia data comprise: video, audio, pictures, documents and so on.

By means of the above system, mutual control between different multimedia terminals can be realized, and one-key control or mode control to player terminal can be easily realized. For example, since it is more convenient to input a control command into a cell phone or computer than into a traditional TV remote control, use of the system can realize the control of TV by a cell phone or computer, thereby making it easier to realize one-key control or mode control of TV.

In one embodiment, a control command list of the multimedia terminal 100 is also stored in the database of the interactive server 200; the control processing module is specifically used for seeking a control command list corresponding to the player terminal according to the identification of the player terminal, seeking a control command corresponding to the control command description in the control command list, and sending the control command to the player terminal.

Since the hardware and system vary between different multimedia terminals 100, the control commands are different between different multimedia terminals 100. However, these control commands have the same operation types, e.g., they all include the operation types such as play, volume adjustment, brightness adjustment and so on. The control command description in the control message of the control terminal records the operation type of the control command.

At initialization, various control commands of the multimedia terminals 100 are stored in the data base of the interactive server 200, which are called real control commands. In this embodiment, the real control commands of the multimedia terminals are stored in the form of a list. The interactive server 200 parses a control command description from the control message of the control terminal, determines a control command list of the player terminal according to the identification of the player terminal, seeks a control command corresponding to the control command description from the determined control command list, and sends this control command to the player terminal.

By means of this embodiment, the flexibility of control is increased, and the difference between various multimedia terminals 100 is shielded, thereby achieving the compatibility of various multimedia terminals 100.

Furthermore, if the multimedia terminals 100 changes, only by updating the real control command of the multimedia terminals 100 on the interactive server 200, the mutual control between the multimedia terminals 100 can still be realized.

For example, in the case where a multimedia terminal, PAD, is changed to another multimedia terminal, ANDROID Tablet (their operating systems are different and the corresponding control commands are also different), it is only needed to update the true control command of the multimedia terminal 100 in the database but it does not need to modify the control message sent by the control terminal.

The interactive server 200 may also reply the terminal information of the player terminal, e.g., IP address of the player terminal, to the control terminal after receiving the control message of the control terminal. The control terminal may also connect and interact directly with the player terminal according to the terminal information.

In one embodiment, the control processing module is specifically used for storing the control command when the player terminal is offline and sending the control command to the player terminal when the player terminal is online.

The offline means that the registered user does not log on the multimedia terminals 100 and no connection is established between the multimedia terminals 100 and the interactive server 200; the online means that the registered user logs on the multimedia terminals 100 and the connection is established between the multimedia terminals 100 and the interactive server 200.

By means of this embodiment, control message can be sent offline, and can be forwarded automatically in a timely manner when the player terminal is online.

In an embodiment, the interactive server 200 further comprises:

a content resource management module is for informing the multimedia terminals 100 to copy the updated multimedia data into the interactive server 200 when the multimedia data of the multimedia terminals 100 are updated.

Further, the content resource management module is also for delivering the updated multimedia data to the multimedia terminals 100 that have no updated multimedia data.

The multimedia terminals 100 that have no updated multimedia data are called multimedia terminals 100 to be delivered.

If the format of the multimedia data used in the multimedia terminals 100 providing multimedia data is different from the format of the multimedia data used in the multimedia terminals 100 to be delivered, the content resource management module is also for performing the delivery after converting the format of the updated multimedia data into the format of the multimedia data used in the multimedia terminals 100 to be delivered.

In the prior art, the multimedia resources in different multimedia terminals 100 are acquired in different ways, the multimedia resources vary with the multimedia terminals 100, and the multimedia terminals 100 can only access their own multimedia resources. However, consumers are increasingly hoping that the contents can freely circulate among different multimedia terminals 100 such as TVs, computers and cell phones. For example, no matter at home, or on the way to work, or in leisure relaxing time, they can uninterruptedly watch the same multimedia content. Therefore, multimedia resources in the home need to be managed uniformly so as to achieve the effect of seamlessly watching the same content. By means of the present embodiment, the multimedia data of various multimedia terminals can be shared, thereby achieving the effect of seamlessly watching the same content.

In one embodiment, the multimedia terminals 100 are also for recording the operating behavior of a registered user at the multimedia terminals 100 and sending the record of operating behavior of the registered user to the interactive server 200.

The information acquisition module is for updating the record of operating behavior of the registered user stored in the database of the interactive server 200 according to the received record of operating behavior of the registered user.

The control processing module is also for providing the player terminal with the stored record of operating behavior of the registered user and indicating whether the player terminal takes the stop time of the last play as the start time of the current play, when the player terminal is playing the multimedia data according to the control command sent. The record of operating behavior of a register user is behavior by a registered user in a local multimedia terminal 100, such as a record of watching a video and a playlist of music. In this embodiment, the multimedia terminals 100 can acquire from the database of the interactive server 200 the watching record of the current registered user last time, e.g., record of the time when the program is withdrawn. Thus, when the registered user watches again, the program can be played starting from the time when the last watching stops.

Embodiment

There are a plurality of multimedia terminals 100 and an interactive server 200, wherein the multimedia terminals 100 and the interactive server 200 are connected via a network. The multimedia terminals 100 comprise: a television, a cell phone, and a personal computer, which are called a three-screen terminal. The network is a transmission channel for the interaction between the multimedia terminals 100 and the interactive server 200 and between the multimedia terminals 100, including wireless network (2G/3G/4G/Wifi/BLUETOOTH, etc.) and fixed network (cable, fiber). In actual application process, the same business may adopt a variety of networks. For example, a device may firstly be connected to the interactive server 200 via a 2G/3G wireless network; if that fails, it may be connected to a network device via a network cable; if that still fails, other communication means such as BLUETOOTH may be used for the connection; and therefore, communication connection with another device is established for interaction.

The multimedia terminals 100 are for establishing a network connection with the interactive server 200 when a registered user logs on, sending to the interactive server 200 a control message for controlling a player terminal when used as a control terminal for controlling another multimedia terminal 100, executing the received control command when used as a player terminal playing multimedia data, the control message containing a control command description and an identification of the player terminal; and recording the operating behavior of the registered user who logs on the multimedia terminals 100, and sending the record of operating behavior of the registered user to the interactive server 200.

Figure 6:
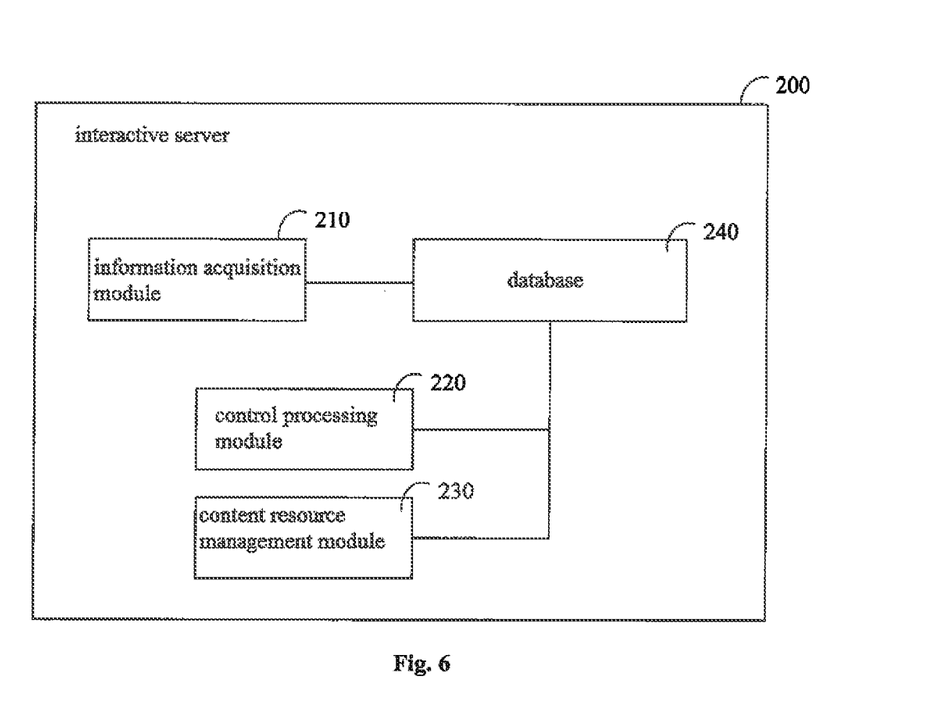
FIG. 6 is structural diagram showing the interactive server in the embodiment of a system for realizing mutual control of multimedia terminals in the home in the present invention.

The interactive server 200 comprises: an information acquisition module 210, a control processing module 220, a content resource management module 230, and a database 240.

The information acquisition module 210 is for storing the user information of the registered user in the database 240, acquiring the terminal information of the multimedia terminals 100 and storing it into the database 240 when establishing a network connection with the multimedia terminals 100, and updating the record of operating behavior of the registered user stored in the database 240 according to the received record of operating behavior of the registered user.

Therein, the terminal information comprises: type, identification and IF address of the multimedia terminals.

The user information comprises: the user's personal information and the record of operating behavior of the user. The user's personal information comprises: the logon account of the user and the preference information of the user. The record of operating behavior of the user is behavior by the user in a local multimedia terminal 100, such as a record of watching a video and a playlist of music.

The control processing module 220 is for parsing the control command description in the received control message according to the type of the control terminal, converting the control command description into a control command corresponding to the player terminal according to the identification of the player terminal in the control message, and sending the control command to the player terminal; and is also for providing the player terminal with the stored record of operating behavior of the registered user and indicating whether the player terminal takes the stop time of the last play as the start time of the current play, when the player terminal is playing the multimedia data according to the control command sent.

The content resource management module 230 is for informing the multimedia terminals 100 to copy the updated multimedia data into the database 240 of the interactive server 200 when the multimedia data of the multimedia terminals 100 are updated, and delivering the updated multimedia data to the multimedia terminals 100 that have no updated multimedia data.

The database 240 is for storing the terminal information and user information and copying the multimedia data.

The foregoing is only a preferred embodiment of the present invention, and it is not used for limiting the protection scope of the present invention. Any modification, equivalent replacement and improvement within the spirit and principles of the present invention should be included in the protection scope of the present invention.

The invention claimed is:

1. A method for realizing mutual control of multimedia terminals in the home, characterized in that the method comprises:
when a registered user logs on multimedia terminals, an interactive server establishes a network connection with the multimedia terminals, and obtains the identification and the type of the multimedia terminals;
the interactive server receives a control message which is sent by a control terminal and is used for controlling a player terminal, the control message including a control command description and an identification of the player terminal; wherein the control terminal is a multimedia terminal controlling another multimedia terminal, and the player terminal is a multimedia terminal playing multimedia data, and the control terminal records the operation type of the control command;
the interactive server parses the control message according to the type of the control terminal, converts the control command description into a control command corresponding to the player terminal according to the identification of the player terminal, and sends the control command to the player terminal so that the player terminal executes the control command;

the interactive server informs the multimedia terminals to copy an updated multimedia data into the interactive server when the multimedia data of the multimedia terminals are updated, and delivers the updated multimedia data to the multimedia terminals that have no updated multimedia data;

wherein:

the interactive server updates a stored record of operating behavior of the registered user according to a record of operating behavior of the registered user on the multimedia terminals that are sent by the multimedia terminals; and the interactive server provides the player terminal with the stored record of operating behavior of the registered user and indicates whether the player terminal takes a stop time of a last play as a start time of a current play, when the player terminal is playing the multimedia data according to the control command sent.

2. The method according to claim 1, characterized in that the interactive server converting the control command description into a control command corresponding to the player terminal according to the identification of the player terminal specifically comprises:

the interactive server seeks a control command list corresponding to the player terminal according to the identification of the player terminal; and the interactive server seeks a control command corresponding to the control command description in the control command list.

3. The method according to claim 1, characterized in that the interactive server sending the control command to the player terminal specifically comprises:

the interactive server stores the control command when the player terminal is offline and sends the control command to the player terminal when the player terminal is online.

4. A system for realizing mutual control of multimedia terminals in the home, characterized in that the system comprises:

an interactive server and a plurality of multimedia terminals;

the multimedia terminals being configured for establishing a network connection with the interactive server when a registered user logs on, sending to the interactive server a control message for controlling a player terminal when used as a control terminal for controlling another multimedia terminal, and executing a received control command when used as a player terminal playing multimedia data, the control message containing a control command description and an identification of the player terminal, and the control terminal records the operation type of the control command;

the interactive server comprising:

a database;

an information acquisition module operatively connected to the database, the information acquisition module being configured for acquiring the identification and type of the multimedia terminals and saving them into the database of the interactive server when establishing a network connection with the multimedia terminals; and a control processing module operatively connected to the database, the control processing module being configured for parsing the received control message according to the type of the control terminal, converting the control command description into a control command corresponding to the player terminal according to the identification of the player terminal in the control message, and sending the control command to the player terminal; and wherein the interactive server is configured to inform the multimedia terminals to copy an updated multimedia data into the interactive server when the multimedia data of the multimedia terminals are updated and to deliver the updated multimedia data to the multimedia terminals that have no updated multimedia data; and the multimedia terminals are also for recording an operating behavior of the registered user and sending the record of operating behavior of the registered user to the interactive server;

the information acquisition module is also for updating the record of operating behavior of the registered user stored in the database of the interactive server according to the received record of operating behavior of the registered user;

the control processing module is also for providing the player terminal with the stored record of operating behavior of the registered user and indicating whether the player terminal takes a stop time of a last play as a start time of a current play, when the player terminal is playing the multimedia data according to the control command sent.

5. The system according to claim 4, characterized in that:

in the database of the interactive server, a control command list of the multimedia terminal is also stored;

the control processing module is specifically for seeking a control command list corresponding to the player terminal according to the identification of the player terminal, and seeking a control command corresponding to the control command description in the control command list.

6. The system according to claim 4, characterized in that:

the control processing module is specifically for storing the control command when the player terminal is offline and sending the control command to the player terminal when the player terminal is online.

* * * * *